United States Patent [19]

Lönnroth

[11] 3,832,896

[45] Sept. 3, 1974

[54] TORQUE METER HAVING A MOVEMENT TRANSMISSION MEMBER

[75] Inventor: Börje Gunnar Arne Lönnroth, Vallingby, Sweden

[73] Assignee: Statens Vag-Och Trafikinstitut, Stockholm, Sweden

[22] Filed: Dec. 16, 1971

[21] Appl. No.: 208,865

[30] Foreign Application Priority Data
Dec. 21, 1970 Sweden.............................. 17344/70

[52] U.S. Cl............................................... 73/136 A
[51] Int. Cl. ............................................... G01l 3/14
[58] Field of Search .......... 73/136 A, 136 B, 136 C, 73/136 R

[56] References Cited
UNITED STATES PATENTS

| 2,260,036 | 10/1941 | Kuehni............................ 73/136 A |
| 2,737,049 | 3/1956 | Waugh............................. 73/136 A |
| 2,754,683 | 7/1956 | Waugh............................. 73/136 A |
| 3,683,685 | 8/1972 | Viegelahn....................... 73/136 A |

FOREIGN PATENTS OR APPLICATIONS

| 1,538,652 | 7/1968 | France.............................. 73/136 C |

Primary Examiner—Charles A. Ruehl
Attorney, Agent, or Firm—Fleit, Gipple, Jacobson

[57] ABSTRACT

A torque meter comprises a hub or the like having two parts being relatively movable under the influence of an applied torque. A separate movement transmission member is attached between the said parts. It comprises integral link portions defined by thin hinges or pivots, said link portions extending in an oblique direction relative to a line connecting opposite places of attachment of the member to the said parts of the hub. One of said link portions is connected to a gauging equipment such as a transducer positioned in the center of the hub. A circumferential distortion between the said parts due to an applied torque will bring about a movement substantially perpendicular hereto, i.e. being parallel with the hub axis, of the last mentioned link portion of the transmission member which movement will be recorded by said gauging equipment as a measure of the applied torque.

10 Claims, 4 Drawing Figures

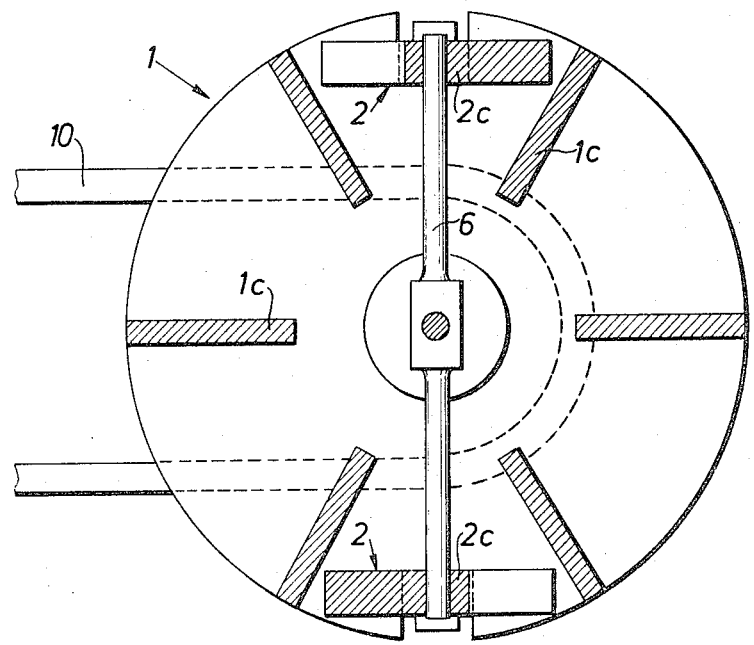
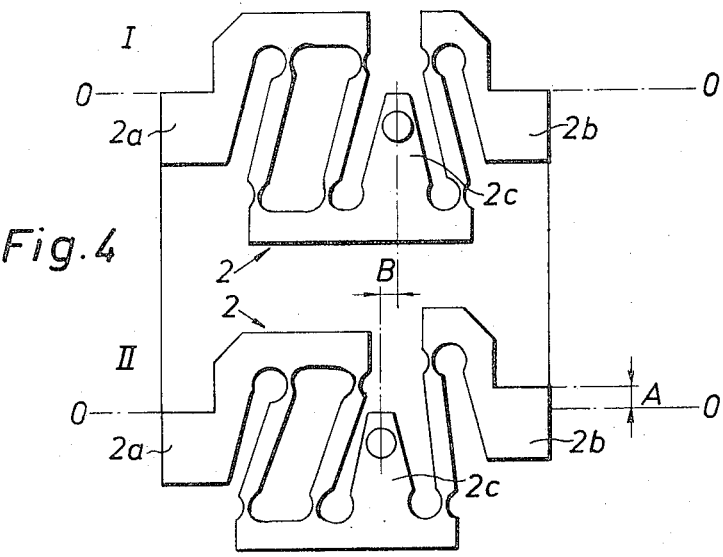

TORQUE METER HAVING A MOVEMENT TRANSMISSION MEMBER

The present invention refers to torque meters comprising a thrust element having one portion which under the influence of an applied torque is adapted to perform a movement relative to another portion of the element which movement transformed to a movement substantially perpendicular thereto is adapted to be directly or indirectly recorded as a measure of the magnitude of the applied torque.

One object of the invention is to accomplish a torque meter of the said kind which comprises few movable parts, has a long service lift and little hysteresis.

These and other objects are fulfiled by a torque meter according to the present invention as defined in the attached claims.

The movement transmission member may be rotatably arranged together with the thrust element, whereas the movement obtained can be brought to actuate a gauging equipment such as a transducer which is fixedly mounted at the center of the rotatable movement. Drawbacks being present in previously known torque meters which by measuring a rotating torque require use of slip rings arranged in different ways, may, thus, be eliminated. Further, the transmission member may be designed in one piece and, thus, lack parts being subject to wear.

Practically, the hinges or pivots of the transmission member may comprise portions having a substantially smaller width than the remaining portions, only amounting to 0.1 – 0.3 millimetres.

Tests have shown that the torque meter as a whole obtains superior charasteristics if the transmission member cooperates with a thrust element having the shape of a rotatable hub with two axially spaced, disc-shaped parts, a relative turning or distortion between the two disc-shaped parts being transmitted to a substantially axially directed movement of the transmission member portion between the two places of attachment. Such a hub has, namely, a very great stiffness against radial and axial thrusts, whereas when a torque is applied to the hub a distortion of suitable magnitude is developed between the disc-shaped parts, which distortion is transformed and enlarged by the transmission member to a suitably adapted axial displacing movement which in suitable manner may actuate a transducer in the center of the hub. The accuracy of the gauging equipment will then be very great, and the exactitude of the gauging operation will not be negatively influenced even during a considerable period of use. A torque meter designed in the way described will therefore have a substantially unlimited service life.

Further features of and advantages obtained by the invention will be evident from the description of a preferred embodiment thereof given below. The description is made with reference to the attached drawings.

FIG. 3 is a cross-sectional view taken on the line 3—3 of FIG. 2 and illustrates the torque meter as seen in an axial direction.

FIG. 4 is an elevational view illustrating a transmission member used in a torque meter according to FIGS. 1–3 in two different positions denoted I and II, namely partly a zero position and partly after occurrence of a displacement movement between the two places of attachment of the member.

Figure 1:
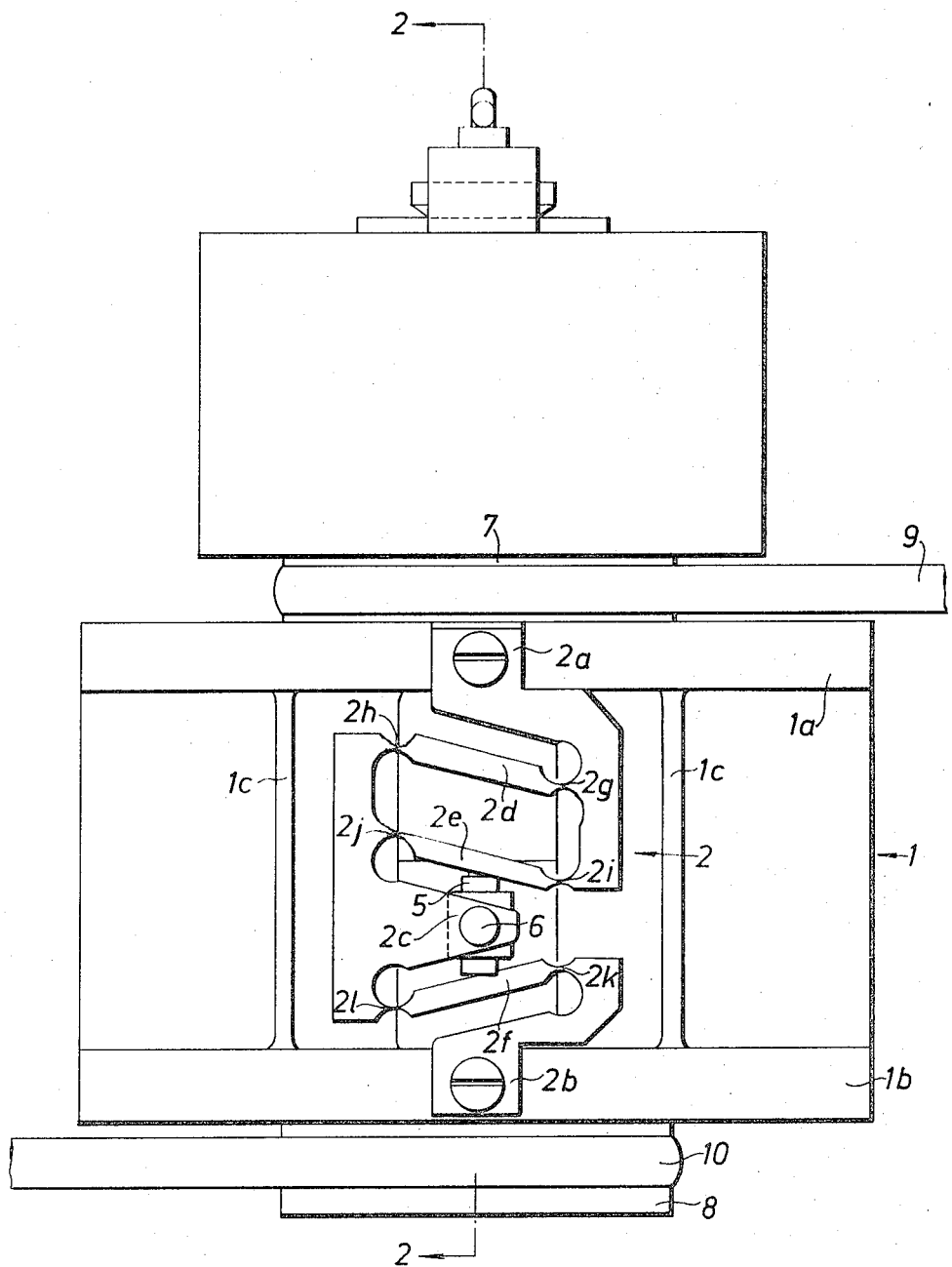
FIG. 1 is an elevational view illustrating the main portions of a torque meter according to the invention.

A torque meter comprises a hub 1 having two axially spaced disc-shaped parts 1a, 1b, a number of spoke-like elements 1c being formed integral with the said parts. They may be described as disc springs directed towards the center of the hub and stiffening the hub radially. At the outside of each disc 1a, 1b there is positioned a scored pulley 7 and 8, and V-belts 9 and 10, respectively, running therearound by means of which a torque is applied to the hub while it is rotating. Instead of V-belts chains or other means may be used in which case the members 7 and 8 are given a corresponding design. If chains are used then the elements 7 and 8 suitably comprise sprocket wheels.

The applied torque will give rise to a distortion or turning movement between the discs 1a and 1b, said distortion being a measure of the torque which is being applied by the V-belts or the corresponding means 9, 10.

In order to measure the said relative turning movement or distortion and thereby the magnitude of the applied torque there is used a transmission member 2, which will be described in detail hereinbelow. The said member transforms the distortion into an axially directed displacement movement which via a rodlike member 5 may influence a differential transformer 4 positioned in the center of the hub so that gauging of the magnitude of the torque by inductive means is permitted.

The transmission member 2 comprises three portions or parts 2d, 2e and 2f serving as links and defined by hinges or pivots 2g, 2h, 2i, 2j, 2k and 2 l. Two of the links 2d, 2e are in parallel with each other and form an angle of about 12° with a perpendicular line connecting the places of attachment of attachment members 2a, 2b of the transmission member to the disc-shaped members 1a and 1b, respectively. A further link 2f of the transmission member has the same declination, i.e. 12° relative to said perpendicular line, said declination, however, being directed in opposite direction. The links 2d and 2e may together with intermediate portions be said to form a parallelogram mechanism. The links or pivots mentioned above comprise portions of the transmission member being as thin as a leaf. Between said parallelogram mechanism and the portion of the member situated between the link 2f and the hinges 2k and 2 l belonging thereto and adjacent portions there is situated one displacement part denoted 2c which at displacement of the attached ends 2a and 2b of the transmission member will perform a movement being substantially perpendicular to the said turning movement. This is illustrated in Figure 4, where I illustrates a starting position. II illustrates that a displacement amounting to A of one end 2b of the member relative to the other end 2a will bring about a displacement of the part 2c perpendicular hereto and amounting to B. In practice the magnitude of the measure A will amount to one or a few tenth millimeters whereas the magnitude of the turning or deflection B may be two or three times as great.

Figure 2:
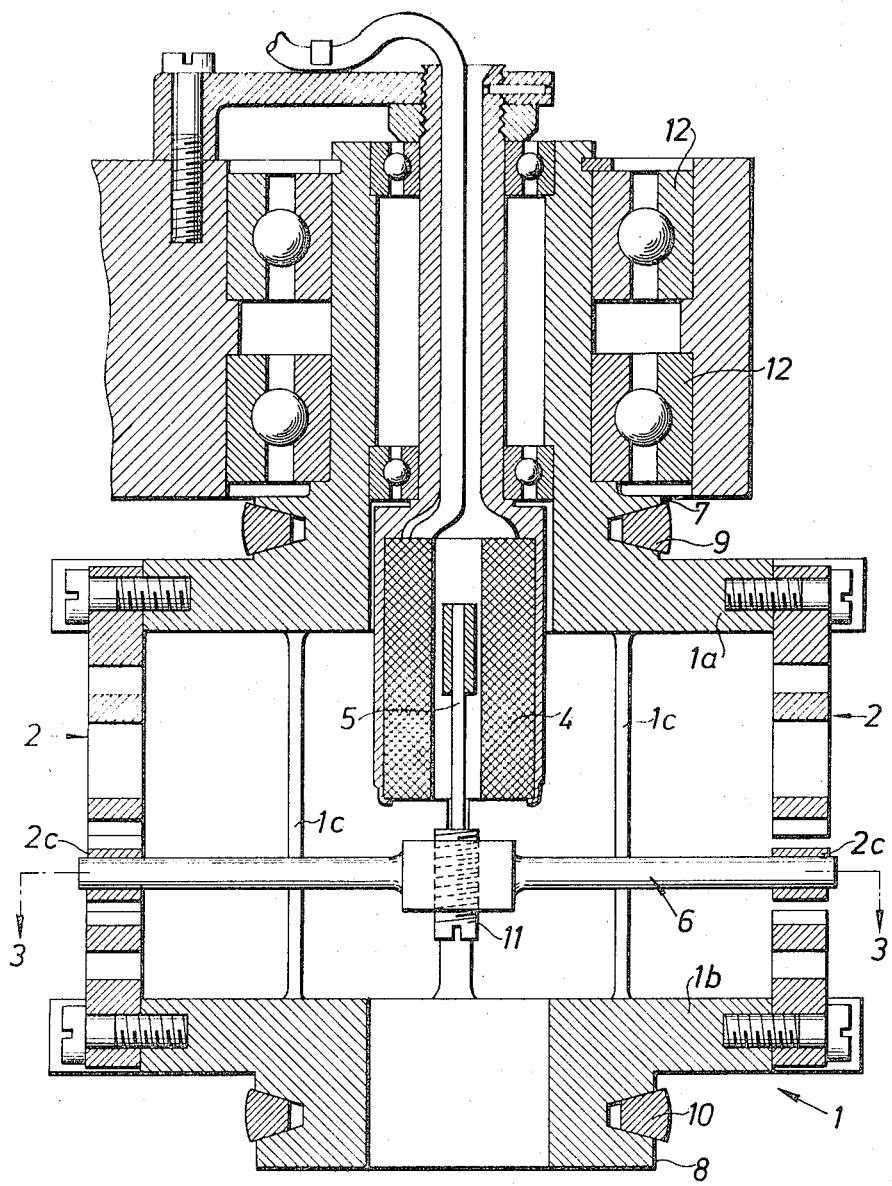
FIG. 2 is a cross-sectional view taken on the line 2—2 of FIG. 1.

As will be evident from FIGS. 2 and 3 two transmission members 2 are positioned diametrically opposite each other at the periphery of the hub. Each displacement part 2c is connected by means of a connection rod 6 at the center of which a rod 5 is adjustably secured by means of a screw 11. In the differential transformer 4 there will be induced a voltage differential the magnitude of which depends upon the amount of the displacement of the rod 5.

In order to permit taking up of great radial and axial thrusts the hub is journalled in heavy bearings 12. These are, however, conventional and are therefore not described in detail. The attached drawings are substantially to scale and the information as regards the size of angles etcetera are relevant for torque meters of the same order of magnitude. If, however, the transmission member for instance is greater the said angle amounting to 12° may also be greater. In certain cases it may for instance amount to 40°. In other cases the angle may be smaller and even close to 1°. The fatigue strength acting on the member will, however, then rise. As a rule the angle shall amount to between 7° and 17° within which region the member has optimum characteristics.

A torque meter according to the invention may be used for a number of different purposes. One example of such a purpose is determining the friction coefficient in ways and landing runways. The hub 1 then carries a rim having a wheel (not shown) mounted thereon, said wheel engaging the ground and being brought to rotate with a speed different from other wheels engaging the ground. The wheel carried by the hub will then slip against the ground, whereby indication of the torque applied to the hub will result in a measure of the friction coefficient of the actual way or landing runway. An example of another technical field in which the invention may be practiced is within the rolling-mill industry.

What I claim is:

1. A torque meter comprising a hub having two axially spaced discs resiliently connected together and angularly movable relative to one another responsive to applied torque; first and second attachment members, each attached to a respective one of said discs; a transmission member interconnecting said attachment members, said transmission member being defined by a plurality of link portions divided into at least two sets with one end of each link of one set being pivotally connected to one of said attachment members, and one end of each link of the other set being pivotally connected to the other attachment member, and a displacement member pivotally connected to the other ends of each of the link portions, said displacement member being displaced axially relative to said hub when said hub is subjected to a torque and said discs move angularly relative to one another; rod means connected to said displacement member so as to move axially therewith; and means responsive to said axial displacement of said rod means for measuring said torque; wherein the links of one of said sets define an oblique angle with the axis of said hub and wherein the links of the other set define an oppositely oblique angle with said axis.

2. The torque meter of claim 1 in which said means responsive to said axial displacement of said rod means for measuring said torque comprises a differential transformer.

3. The torque meter of claim 2 in which said differential transformer includes an inductive gauge positioned in the center of said hub and comprising a solenoid in which said rod means is displaceable.

4. The torque meter of claim 1 in which at least two of the link portions of said transmission member are parallel to each other.

5. The torque meter of claim 1 in which said transmission member is formed from spring steel.

6. The torque meter of claim 1, wherein said links define an angle of 40° or less with a perpendicular to the axis of said hub.

7. The torque meter of claim 6, wherein said angle is between approximately 7° and 17°.

8. The torque meter of claim 7, wherein said angle is about 12°.

9. The torque meter of claim 1, wherein said torque meter comprises two transmission members mounted on diametrically opposite sides of said hub.

10. The torque meter of claim 1, wherein said axially spaced disks are connected together by a plurality of spokes.

* * * * *